(12) United States Patent
Leblanc

(10) Patent No.: US 6,305,484 B1
(45) Date of Patent: Oct. 23, 2001

(54) AUTOMATED AIRCRAFT TOWING VEHICLE SYSTEM

(76) Inventor: Edward L. Leblanc, 14 Richard Street, Whitefish, Ontario (CA), P0M 3E0

( * ) Notice: Subject to any disclaimer, the term of this patent is extended or adjusted under 35 U.S.C. 154(b) by 0 days.

(21) Appl. No.: 09/541,039

(22) Filed: Mar. 31, 2000

(51) Int. Cl.⁷ .................................................... B60T 7/16
(52) U.S. Cl. ............................................ 180/167; 180/904
(58) Field of Search ................................. 180/904, 167, 180/169; 244/50

(56) References Cited

U.S. PATENT DOCUMENTS

| | | | |
|---|---|---|---|
| 3,617,962 | * 11/1971 | Wilson | 335/151 |
| 3,761,040 | * 9/1973 | Cummins | 244/2 |
| 3,807,664 | 4/1974 | Kelly, Jr. et al. | |
| 4,113,041 | * 9/1978 | Birkeholm | 180/14 C |
| 4,130,210 | 12/1978 | Purviance | |
| 4,197,536 | * 4/1980 | Levine | 343/5 LS |
| 4,791,570 | * 12/1988 | Sherman et al. | 364/436 |
| 4,991,862 | * 2/1991 | Tsao et al. | 280/421 |
| 5,219,033 | 6/1993 | Pollner et al. | |
| 5,261,778 | 11/1993 | Zschoche | |
| 5,511,926 | 4/1996 | Iles | |
| 5,816,352 | * 10/1998 | Hacker | 180/167 |
| 5,839,086 | * 11/1998 | Hirano | 701/201 |

FOREIGN PATENT DOCUMENTS

| | | | |
|---|---|---|---|
| 0521257 A3 | * 1/1993 | (EP) | |
| 2695099 | * 3/1994 | (FR) | |
| 2267068 | * 11/1993 | (GB) | 180/904 |
| 8903343 | * 4/1989 | (WO) | |

* cited by examiner

Primary Examiner—Brian L. Johnson
Assistant Examiner—Daniel Yeagley
(74) Attorney, Agent, or Firm—Marks & Clerk

(57) ABSTRACT

An automated aircraft towing vehicle system for use with aircraft is provided. When coupled to an aircraft the towing tractor vehicle facilitates the movement of the aircraft without the requirement for use of the aircraft's jet engines. The towing vehicle system comprises a towing tractor vehicle having remotely controllable steering, braking, and acceleration. The remote system controller is located in the aircraft being towed such that the pilot of the aircraft being towed is capable of controlling the starting, stopping and steering of the towing tractor vehicle. The towing tractor vehicle further includes a remotely controllable de-coupling means. When the aircraft is towed to the desired location, the decoupling of the aircraft from the towing tractor vehicle is controllable by the remote system controller.

15 Claims, 4 Drawing Sheets

AUTOMATED AIRCRAFT TOWING VEHICLE SYSTEM

FIELD OF THE INVENTION

This invention relates to the field of ground movement of an aircraft. More specifically, the present invention relates to the towing of an aircraft by a towing tractor to a desired location without the use of the aircraft jet engines for taxiing the aircraft.

BACKGROUND Of THE INVENTION

The field encompassing ground movement of aircraft is well-known in the prior art. In the industry, the engines of the aircraft are almost exclusively used to move the aircraft around an airport, typically when taxiing to or from a runway. These engines are generally speaking very loud and, when operating for the purpose of ground movement, they burn large quantities of fuel. Safety reports posted on a NASA government website have remarked on several incidents where people have been knocked off a lowered stairway of a second aircraft by the jet blast from a nearby first aircraft taxiing to or from a runway. The same report, *Aviation Safety Reporting, System (ASRS) Directilne*, Issue Number 6 for August, 1993—available at http://olias.arc.nasa.gov/asr/d16_blast.htm—also discusses damage to other aircraft due to the ground jet blast hazard of nearby taxiing aircraft. These jet engines may cause violent air disturbances in the near vicinity of the aircraft, and also contribute to noise and air pollution.

In addition, the costs associated with the period of time an aircraft idles on the taxiway, as well the length of time for taxiing to a runway, are very large. The chart below details a cost summary for certain major airlines, on the basis of a total idling time of 20 minutes or 1 hour per day per aircraft per airline, using typical fuel consumption figures and an average cost of fuel per gallon. The "idle" time being considered is that time spent by the aircraft from the moment the engines are started until the aircraft reaches the end of the runway for takeoff, minus a typical warmup time of three minutes per engine. The idling time therefore includes all time after pushback, such as taxiing time, and standing in a queue of waiting aircraft on a taxiway. It is believed that such idling time is not less than 20 minutes per aircraft per day, and may be much more.

| Airline (37.5% of Fleet) | Cost for 1 Year to: Idle 1 hr./ Day | Cost for 1 Year to: Idle 20 Min./Day |
| --- | --- | --- |
| Canadian Airline No. 1 | $14,842,915 | $4,947,638 |
| US Airline No. 1 | $26,699,809 | $9,899,936 |
| British Airline No. 1 | $26,965,859 | $8,988,620 |
| US Airline No. 2 | $16,638,040 | $5,546,013 |
| US Airline No. 3 | $33,596,174 | $11,198,725 |
| Courier No. 1 | $20,515,312 | $6,838,437 |
| US Airline No. 4 | $26,892,175 | $8,964,058 |
| US Airline No. 5 | $42,785,894 | $14,261,965 |
| US Airline No. 6 | $17,233,063 | $5,744,354 |
| Assume: Fuel Consumption: | 3200 lbs/hr/aircraft 6 lbs/US gallon Fuel Cost: $0.95/US gallon | |

The above chart outlines the saving that could be obtained by the airlines by either eliminating or reducing the idle rime of the aircraft in their fleet. This leads to the field of ground movement of aircraft as it relates to the use of an external vehicle to facilitate that around movement. Tractors, dollies, or tugs, as they are sometimes called, exist in the present day in a number of different embodiments. Typically, the operator manned vehicles provide a means of coupling the vehicle to the aircraft at which point the aircraft is pushed or towed. The means for coupling is commonly a tow bar system which cradles the nosewheel of the aircraft and further provides an attachment point to the aircraft such that, when in place, the aircraft may be to the pushed or towed. In the alternative, a dolly may also be designed to receive the wheels of an aircraft and, when the wheels are in place on the dolly, the aircraft again may be pushed or towed. The means for coupling may be manual or operator controlled. The most typical use for aircraft tractor vehicles is for pushback from the terminal gate after the aircraft is loaded for its next flight; and sometimes for towing an aircraft to a hangar for maintenance operations.

DESCRIPTION OF THE PRIOR ART

U.S. Pat. No. 3,807,664 issued to KELLY et al teaches a self-contained aircraft taxiing system. This systems comprises a means for ground movement of an aircraft without the use of an external power source. A primary energy source to facilitate the movement of the aircraft is contained within or on the aircraft, and supplies power to a means for driving the wheels of the aircraft. Thus, the engines of the aircraft must have been started.

U.S. Pat. No. 4,130,210 issued to PURVIANCE teaches a self-propelled airplane dolly. The dolly has a vertically power adjustable ramp having a mobile frame that is designed to receive and elevate the nosewheel of an aircraft such that the aircraft may be moved to another location. The dolly is manually controlled by an operator through the use of the controls on the dolly to engage the nosewheel of the aircraft onto the ramp, and then steer the aircraft to the desired location.

U.S. Pat. No. 5,219,033 issued to POLLNEW et al teaches a tractor for aircraft. The tractor provides a means to tow an aircraft and comprises means for coupling the tractor to the nosewheel undercarriage of the aircraft, an internal combustion engine, and a driving means. The engine output is controllable by means of an accelerator. The invention is intended to limit the abrupt acceleration process which can place undue stress on the nosewheel of the aircraft.

U.S. Pat. No. 5,261,778 issued to ZACHOCHE teaches a universal aircraft tug assembly. The assembly includes a self-propelled chassis that responds to operator control. There is provided an adjustable cradle assembly that receives a nosewheel. The receiving apparatus has two adjustable arms that facilitate the receiving of varying sized aircraft nosewheels. Hydraulic actuators lift the nosewheel assembly onto the tug such that the aircraft may be moved without starting of the aircraft engines.

U.S. Pat. No. 5,511,926 issued to ILES teaches a self-propelled dolly for the movement of an aircraft. The dolly includes a first pair of laterally spaced apart ground engaging wheels, and a second pair of ground engaging wheels each being connected to a bifurcated chassis. The second pair of wheels provide steering ability to the dolly. The first pair of wheels are mounted about a portion of a first axle which is mounted in respective parallel members which define a space therebetween so as to receive an aircraft wheel.

SUMMARY OF THE INVENTION

In accordance with one aspect of the present invention, there is provided an automated aircraft towing tractor vehicle system for use with aircraft, and primarily for use with large multi-engine aircraft. When coupled to the aircraft, the automated towing tractor vehicle facilitates movement of the aircraft without the requirement for use of the aircraft's jet engines. This coupling in turn is the source of great cost savings due to a decreased idling time per aircraft, especially when taxiing to the runway. The length in idling is directly related to the cost of fuel; the longer the aircraft idles, the more fuel it burns. As the amount of fuel burned increases, so does the cost to operate the aircraft. Using a towing tractor vehicle to move an aircraft from the gate to the runway substantially decreases the idling time of the aircraft and in tun, results in a reduced operating cost of the aircraft.

The remote controlled aircraft towing vehicle system of the present invention is intended for use with large multi-engine aircraft, and comprises a towing tractor vehicle for aircraft, a remote steering control means for the towing tractor vehicle, and a remote acceleration and braking control means for the towing tractor vehicle. The towing tractor vehicle is steerable by the remote steering control means, and is capable of being, started, accelerated, decelerated, and stopped by the remote acceleration and braking control means. A remote system controller is located in the aircraft being towed; typically, the remote system controller at least includes a first remote acceleration and braking control means so as to control the starting and stopping of the towing tractor vehicle. After the towing tractor vehicle has been started, so as to cause movement of the towing tractor vehicle and concurrent movement of the aircraft being towed, steering of the towing tractor vehicle is under the control of the remote steering control means for the towing tractor vehicle. Thus, when the towing tractor vehicle is coupled to the aircraft to be towed, movement of the aircraft to the desired location is effected under the control of the remote system controller in the aircraft being towed, and the remote steering control means. Finally, the towing tractor vehicle further includes remote decoupling control means for decoupling the remote control means from the aircraft being rowed after the aircraft and the towing tractor vehicle has reached the desired location.

The remote control aircraft towing vehicle system of the present invention is such that the remote steering control means for the towing tractor vehicle is remotely controlled by the remote system controller located in the aircraft being towed. In other words, the pilot of the aircraft being towed would control the steering of the towing tractor vehicle.

Alternatively, the remote steering control means for the towing tractor vehicle may be remotely controllable by a guidance system mounted under a taxiway or the edge of the taxiway along which the aircraft is being rowed. Of course, it is possible that the towing tractor vehicle may be equipped so as to be variously controlled by the pilot of the aircraft being towed or by a remote guidance system. Also, especially when the towing tractor vehicle is being returned to the terminal for its next use, it may be autonomously controllable by a GPS or inertial guidance system, or a guidance system mounted under or at the edge of a taxiway.

As noted, there may be requirements for the towing tractor vehicle to be controllable by an operator. In that case, when operator control of the towing tractor vehicle is desirable, the operator control overrides the remote steering control means and the remote acceleration and braking control means for the towing tractor vehicle.

Generally, when there is a connection made between the towing tractor vehicle and the aircraft, the coupling is by way of a towing bar which is attached to the nosewheel assembly of the aircraft to be towed.

At least the uncoupling of the aircraft from the towing vehicle is remotely controlled and automated, while the coupling process may be manual. Once the aircraft is towed to the desired location by the towing vehicle, the towing vehicle is decoupled from the aircraft. At this point the towing vehicle must be relocated. The pilot of the aircraft may direct the steering means of the towing vehicle by way of a remote control means located in the aircraft so as to steer the towing vehicle to a desired location under the further direction and instruction of the control tower. Alternatively, the towing tractor vehicle may be operated manually by an operator exercising control of the towing vehicle and thereby driving the towing vehicle to a desired location. When there is a need to move at least two rowing vehicles simultaneously, each towing vehicle includes towing means such that they may be towed together to a desired location.

There is communication between the towing tractor vehicle and the remote system controller located in the aircraft being cowed, generally by way of wireless communication at a distinct frequency or by using a digital ID coding technique, which in either event is assigned co each specific towing tractor vehicle.

When the rowing tractor has been decoupled from the vehicle being towed, further movement of the towing tractor vehicle comes under the control of the remote steering control means and the remote acceleration and braking control means, whereby the towing tractor vehicle is moved to a second desired location. Typically, the second desired location for the towing tractor vehicle is a parking area adjacent the taxiway along which the towing tractor vehicle has towed an aircraft, or a parking area adjacent the terminal building from which the towing tractor vehicle will next be used to tow an aircraft.

Typically, the towing tractor vehicle includes a position data feedback system which may be chosen from the group consisting of GPS, LORAN, and a gyro-based position sensor. Thus, the precise location of the towing tractor vehicle may be determined at any instance in time by computer means located on the rowing tractor vehicle and associated with the GPS, LORAN, or gyro-based position sensors. Additionally, a control tower at the airport may determine the precise location of the towing tractor vehicle at any instance in time.

For safety reasons, in particular, the starting acceleration, deceleration, and braking of the towing tractor coupling may be overridden by a second remote acceleration, deceleration, and braking control means which is located in the control tower. Thus, if a ground traffic controller visually senses or is informed by his ground control radar that there is imminent danger surrounding the movement of any aircraft by a remote controlled rowing vehicle system in keeping with the present invention, he may immediately stop the movement of any specific towing tractor vehicle or vehicles.

Other means for providing steering control for the towing tractor vehicle comprise an automated guidance system which is coupled to a position data feedback system on the towing tractor vehicle. Thus, realtime steering control and realtime acceleration and braking control of the towing tractor vehicle may be exercised.

Moreover, especially when the position data feedback system on board the towing tractor vehicle is GPS-based or gyro-based, then realtime steering during control and realtime acceleration and braking control of the towing tractor vehicle is effected by a computer controlled inertial guidance system coupled to theGPO based or gyro-based position data feedback system, in keeping with a pre-programmed set of guidance instructions in a computer therefore.

Of course, the present invention also provides a method for facilitating the reduction of fuel consumption by large multi-engine aircraft. Simply put, that method comprises the steps of:

(a) coupling an aircraft of to an automated aircraft vehicle towing system as described above;

(b) towing the aircraft by the aircraft rowing vehicle to its desired location, without starting the aircraft's engines;

(c) starting the aircraft's engines; and (d) decoupling the towing tractor vehicle from the aircraft Accordingly, use of the towing tractor vehicle and the system therefore, in keeping with the present invention, eliminates a portion of the aircraft's idling time such that the engines thereof may be started upon the aircraft's arrival at the desired location, thereby conserving the fuel which would otherwise be required for taxiing the aircraft to the desired location.

The aircraft which may be moved by a remote control aircraft towing vehicle system in keeping with the present invention are typically large multi-engine aircraft which may be multiple jet aircraft, or aircraft having multiple turbine engines—typically referred to as turboprop aircraft The present invention may also be employed, in some circumstances, for towing an aircraft once it has landed and moved off the active runway on to a taxiway. However, generally aircraft are moved relatively quickly to the debarkation gate, whereas departing aircraft very often have to stand in a long queue of aircraft waiting for access to the active runway for takeoff, so the greater relevance of the present invention is directed to departing aircraft rather than to arriving aircraft.

However, there may be some circumstances where aircraft takeoff and land on the same runway or runways which are close together, and especially where the end of the runway is a considerable distance from the terminal, towing tractor vehicles systems in keeping with the present invention, may be directed to the remote end of an active runway after they have towed an aircraft out to that runway, so as to be re-coupled to an arriving aircraft and to tow chat arriving aircraft back to the terminal.

The present invention has the added advantage of increasing the period of time between engine overhauls. The total operating time of the engine between overhauls is pre-set. However, by decreasing the idling time of the aircraft before, and sometimes after, each flight, there is also a substantial decrease in the operating time of the engines. This, in turn, allows for additional flights before the aircraft is taken out of service for routine maintenance.

Still other advantages which accrue from the present invention include the reduction of environmental pollution which can be obtained by minimal operation of idling aircraft engines. This results in fewer emissions, including, especially sulphur- and nitrogen-based toxic emissions.

Still further, if an aircraft engine is not running while the aircraft is being towed along a taxiway, in keeping with the present invention, there is less opportunity for ingesting debris from the taxiway into the aircraft's engines from the taxiway, or other jet-blast related incidents in congested aircraft loading and unloading areas.

Yet a further advantage which accrues from the present invention is, the fact that the weight of fuel which is saved by practicing the present invention can be replaced, for each flight that each aircraft makes, by additional payload. This, in turn, will enhance the profit earning capabilities for the owner/operator of the aircraft.

BRIEF DESCRIPTION OF THE DRAWINGS:

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings arc for the purpose of illustration and description only and are not intended as a definition of the limits of the invention. Embodiments of this invention will now be described by way of example in association with the accompanying drawings in which.

Figure 1:
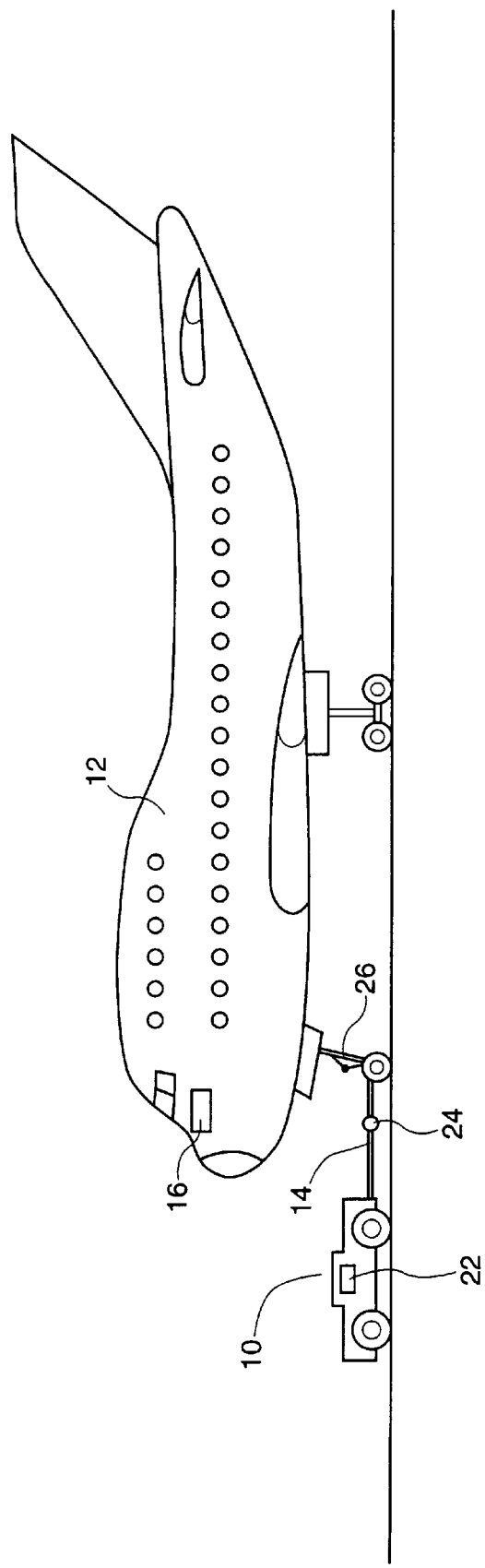
FIG. 1 is a general view of an aircraft having a towing tractor vehicle coupled thereto.

DETAILED DESCRIPTION Of PREFERRED EMBODIMENTS:

Several general comments are appropriate in order to understand the present invention and the operating environment in which it is placed. Typically, the present invention can relate to modified towing tractor vehicles of the sort which are normally used for towing aircraft, and being of the type which have been described above. However, several modifications are required, not the least which is that a towing tractor vehicle which is in keeping with the present invention must be adapted for remote steering control and for remote acceleration and braking control.

It is generally outside the scope of the present invention, but it is evident that apart from the towing tractor vehicles being fitted in order to operate in keeping with the present invention, they will generally also be fitted with an appropriate avoidance system which prevents the towing tractor vehicle from colliding with other aircraft, other mobile equipment including other towing tractor vehicles, fuel trucks, provisioners' trucks, and the like, as well as people such as baggage handlers, gate supervisors, or the like who may be on a taxiway and particularly in the vicinity of terminal, gates at which aircraft are parked for embarkation and debarkation of passengers and the loading and unloading of cargo.

A typical use of towing tractor vehicles, and specifically of the remote controlled aircraft towing vehicle systems, in keeping with the present invention, is to take a departing aircraft from the gate to the runway from which it will take off. The initial steps for use of towing tractor vehicles in keeping with the present invention is the same as always: when the aircraft is ready to depart, a towing tractor vehicle is brought to the front of the aircraft and attached to the aircraft—usually, to the front wheel assembly of the aircraft. Pushback then occurs whereby the aircraft is backed away from the gate. Typically, a sort of "three-point" turn is executed, whereby the aircraft is positioned so that it may move off under its own power to a taxiway, and thence to a runway. However, in keeping with the present invention, the towing tractor vehicle is not decoupled from the aircraft; rather, it will tow the aircraft out to the end of the active runway—or nearly to the end of the active runway—from which the aircraft will take off. Only at that time will the aircraft engines be started, rather than being started immediately after pushback for taxiing under its own power.

Of course, the present invention recognizes that it is not appropriate for aircraft towing tractor vehicles to be placed on an active runway; and the present invention also recognizes that typically a warmup period of at least three minutes per engine is required for engine warmup and preflight checks by the pilots of the aircraft. However, the present invention seeks to reduce idling time of aircraft engines before the aircraft enters the active runway for takeoff, by permitting towing of the aircraft to nearly the end of the runway, on the taxiway which is beside the runway or which approaches the end of the runway, at which point the aircraft engines may be started, warmed up, and all other steps required for safe operating of the aircraft may be taken. At that point, the towing tractor vehicle is decoupled from the aircraft, and is sent to another location as described hereafter.

As noted above, a number of benefits accrue from the present invention by towing an aircraft to near the end of the active runway for takeoff without the engines of the aircraft being in operation. They include lower fuel consumption and the concomitant lower operating costs, therefore giving rise to lower running time on the engines and more flights for the aircraft before engine overhauls. It may be possible for the aircraft to carry less fuel and therefore carry more payload.

Of course, idling and taxiing aircraft engines produce considerable environmental pollution; the present invention eliminates such pollution. It also eliminates noise of idling and taxiing aircraft engines, especially in areas adjacent to and surrounding passenger terminals.

The present invention contemplates that in some conditions, a cooperative ownership and operation of towing tractor vehicles in keeping with the present invention will be appropriate, whereby various airlines may assist one another, or whereby a third operating party which owns and operates the towing tractor vehicles may be situated at any airport.

The matter of control of the towing tractor vehicle is described in greater detail hereafter. However that control may be in the hands of the pilot of the aircraft being rowed, it may be in keeping with a control system which is mounted beneath or at the edge of the taxiway, or it may be by way of an inertial guidance or other means such as GPS-based guidance system. Control may also be in the hands of ground traffic controllers located in the control tower of the airport. In any event, each towing tractor vehicle is assigned its own operating frequency, or unique digital ID code, for all communications to and from that towing tractor vehicle—which in keeping with the present invention is otherwise unmanned.

It follows that additional savings may be achieved by operating unmanned towing tractor vehicles, thereby reducing labor costs.

While it will be noted hereafter, it must recognized that braking and acceleration—that is to say, stop and go of the aircraft—is under the control of the pilot of the aircraft. Not only does the pilot have a good view from the cockpit of the aircraft as to where it is being rowed, and as to oncoming aircraft from other gates, and so on, the pilot is in constant communication with ground control while his aircraft is being taxied. However, movement of any aircraft is under the ultimate direction and instructions of ground control, and typically ground control is in possession of and may exercise additional control means for starting and stopping—that is, for enabling or disabling—the towing tractor vehicle.

Of course, the present invention recognizes that any multi-engine aircraft is equipped with an auxiliary power unit, usually installed in the tail of the aircraft below the rudder and between the elevators, which picks up the electrical and air-conditioning loads of the aircraft when the main engines of the aircraft are not running. Such electrical and air-conditioning loads will continue to be carried by the auxiliary power unit, at least while the aircraft is taxiing, and until the main engines of the aircraft have been started. Of course, the present invention assumes that the engines—or at least one of the engines—on the aircraft are self-starting, and will start without the necessity for use of an external starter.

As will be noted hereafter, the typical manner in which a towing tractor vehicle is coupled to an aircraft is by use of a tow bar. It is necessary, in keeping with the present invention, that the tow bar must have its own auxiliary wheels, or otherwise be liftable away from the ground, so that once it is decoupled from the aircraft it does nor drag along the tarmac as the towing tractor vehicle is being further moved.

Figure 4:
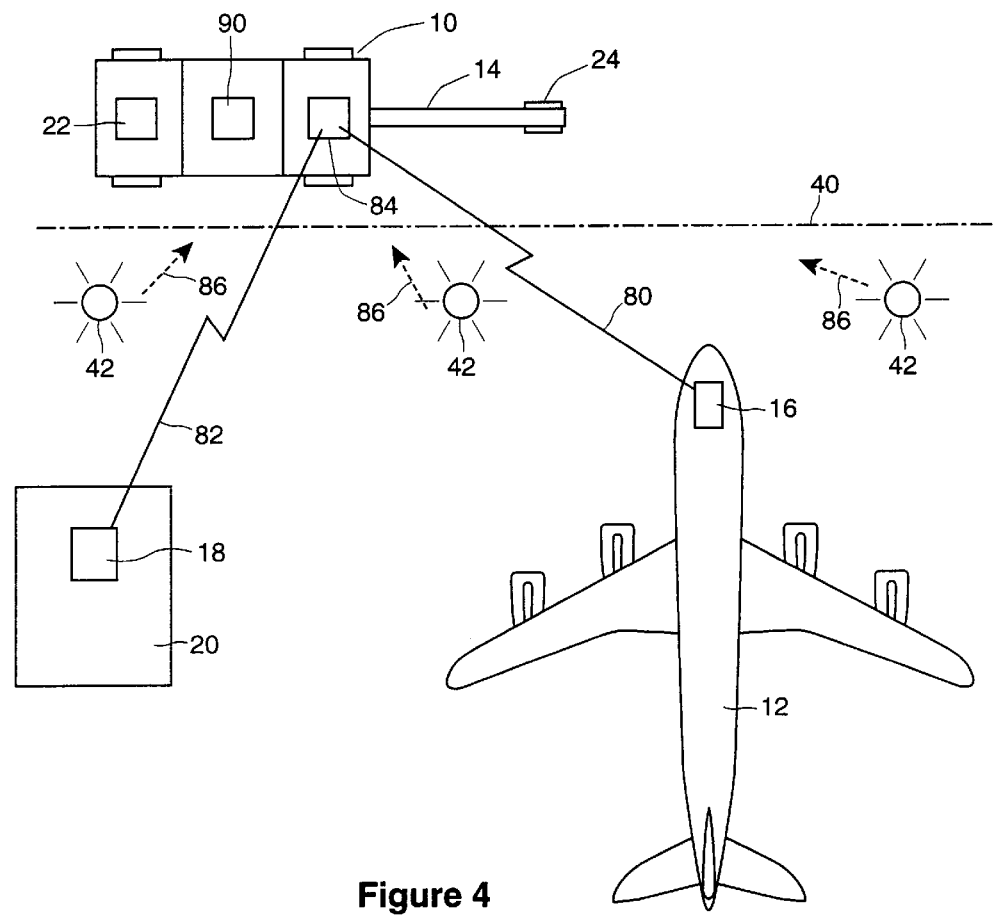
FIG. 4 schematically represents the typical components which comprise a remote control aircraft towing vehicle system in keeping with the present invention.

Referring now to FIGS. 1 and 4, the general arrangement for a remote controlled aircraft towing vehicle system in keeping with the present invention is shown. A typical towing tractor vehicle is shown at 10, coupled to an aircraft 12 by a tow bar 14. The towing vehicle system comprises a remote steering control means for the towing tractor vehicle 10, which remote steering control means may be included in a remote system controller 16 located in the aircraft 12. The remote steering control means may also comprise a number of other alternatives, as described hereafter.

Further, there is remote acceleration and braking control means for the towing tractor vehicle system, which remote control acceleration and braking control means may also be located in the remote system controller 16, or a similar controller 18 which is located at the airport control tower 20.

In any event, an additional controller means 22 is found on the towing tractor vehicle 10, so that the towing tractor vehicle 10 is steerable by the remote steering control means and is capable of being started, accelerated, decelerated, and stopped, by the remote acceleration and braking control means. In other words, the towing tractor vehicle 10 is essentially a remote controlled vehicle.

As noted above, it is typical that the remote system controller 16 at least includes a first remote acceleration and braking control meals so as to control the starting and stopping of the towing tractor vehicle 10.

Obviously, after the towing tractor vehicle 10 has been started so as to cause movement of the towing tractor vehicle and concomitant movement of the aircraft 12 which is to be towed, then steering of the towing tractor vehicle is under the control of the remote steering control means, as described in greater detail hereafter. Accordingly, when the towing tractor vehicle 10 is coupled to the aircraft 12 to be towed, movement of the aircraft to a desired location is effected under the control of the remote system controller 16 in the aircraft 12, and the remote steering control means which is described in greater detail hereafter, in its alternative forms.

Finally, the towing tractor vehicle 10 further includes a remote decoupling control means (not shown) for decoupling the towing tractor vehicle 10 from the aircraft 12, when the desired location to which the aircraft 12 is to be towed has been reached.

As noted, the tow bar 14 is equipped with auxiliary wheels 24 so that once the tow bar 14 has been decoupled from the front wheel assembly 26 of the aircraft 12, the end of the tow bar 14 does not drag along the tarmac when the towing tractor vehicle 10 is being further moved.

The remote steering control means for the towing tractor vehicle may, as noted, be remotely controllable by the remote system controller 16 which is located in the aircraft 12. The remote system controller 16 is not necessarily one which is permanently installed in the aircraft 12, thereby requiring re-certification of the aircraft; and it may be portable so as to be carried onto the aircraft by the pilot or other cockpit crewmember, or it may stay in the aircraft and move from airport to airport.

An alternative arrangement for the remote steering control means for the towing tractor vehicle 10 is such that the towing tractor vehicle 10 is remotely controllable by a guidance system such as a cable 40 which may be mounted under a taxiway, or by beacons or other control devices 42 mounted at the edge of the taxiway. Indeed, the towing tractor vehicle 10 may be such that either system will be operative at any given time, under the supervisory control of the pilot of the aircraft 12 or under the control of a ground controller located in the control tower 20.

Figure 2:
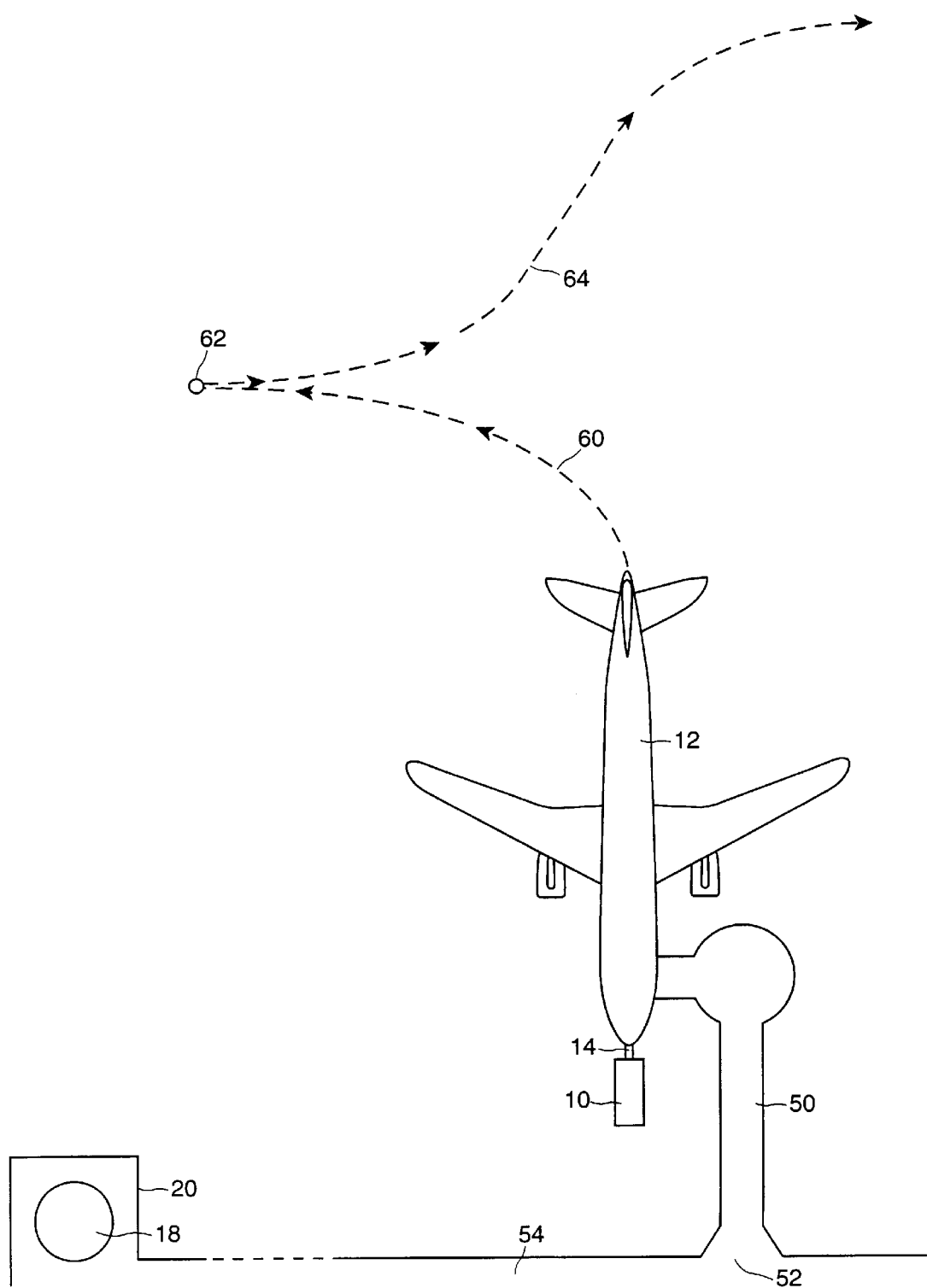
FIG. 2 is a general view showing the pushback and three-point turn of a departing aircraft away from a departure gate.
Figure 3:
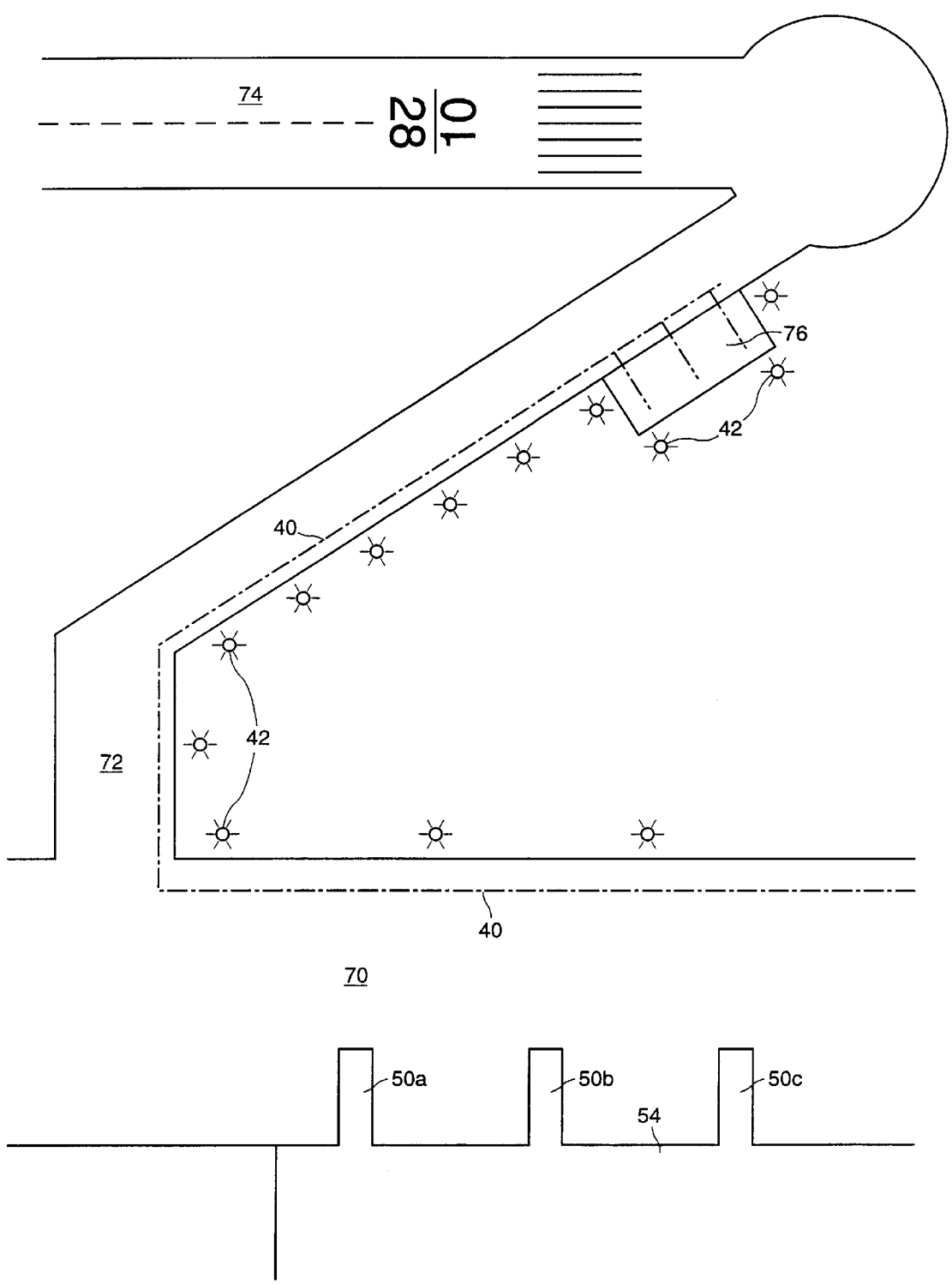
FIG. 3 is indicative of a typical layout by which various guidance systems may be installed at an airport.

Thus, turning to FIGS. 2 and 3, it will be seen that when the aircraft 12 is ready to leave the terminal 54 by being pushed back from the walkway 50 at gate 52, the aircraft 12 then follows a path shown generally at 60. The aircraft is stopped at 62, and then moves forwardly as at 64. However, in keeping with the present invention, the aircraft 12 continues to be towed by the towing tractor vehicle 10 along path 64.

Figure 5:
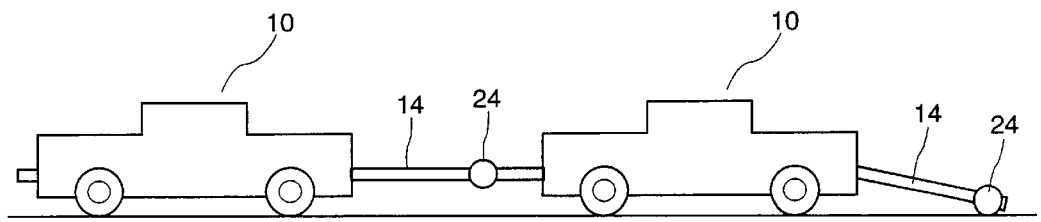
FIG. 5 indicates more than one towing tractor vehicle coupled together for return.

As shown in FIG. 3, a plurality of walkways 50A, 50B, 50C, extend out onto parking tarmac 70 from which aircraft will depart, to move onto a taxiway 72 and ultimately to arrive at the end of runway 74 for takeoff. However, near the end of the taxiway 72, where it approaches the end of runway 74, there is located an area 76 which acts substantially as a parking lot or marshalling area for a variety of towing tractor vehicles 10, until they are retrieved to be moved back to another location from whence they will be used again. Typically, as noted above, several towing tractor vehicles 10 may be coupled together in the manner shown in FIG. 5, where one vehicle 10 may tow other vehicles, with the auxiliary wheels 24 on the tow bar 14 of the last vehicle being in contact with the tarmac.

The present invention allows that the towing tractor vehicle 10 may be further controllable by an operator. Thus, when operator control of any towing tractor vehicle is desirable or required, the operator control will override the remote steering control means and the remote acceleration and braking control means for the towing tractor vehicle.

As noted, communication between the towing tractor vehicle 10 and any remote system controller 16 or 18 is by way of wireless communication such as shown at 80 and 82 in FIG. 4. Likewise, communication between the towing tractor vehicle 10 and a remote guidance cable 40, or beacons 42, is shown at 84 and 86, respectively.

The communication between any specific towing tractor vehicle 10 and any remote system controller 16 or 18 is carried out at a distinct frequency, or using a distinct digital ID code, which is assigned to that specific towing tractor vehicle 10.

Thus, when the towing tractor vehicle 10 has been decoupled from the aircraft 12, the remote steering control means and the remote acceleration and braking control means for the towing tractor vehicle 10 will direct and facilitate the further movement of the towing tractor vehicle 10 to a second desired location, such as the region 76.

Alternatively, the towing tractor vehicle 10 may be returned to a parking area which is adjacent to terminal 54, from which it will next be used to tow another aircraft 12.

In general, the towing tractor vehicle 10 includes a position data feedback system, which may be GPS, LORAN, or a gyro-based sensor. Thus, the precise location of the towing tractor vehicle 10 may be determined at any instant in time by appropriate computer means located on the towing tractor vehicle 10, or optionally by the control tower 20. This permits location of the towing tractor vehicle, so that the tower 20 may know where it is at any instant in time. Moreover, such an arrangement also permits remote guidance of the towing tractor vehicle 10 by interaction between the remote steering control means for the towing tractor vehicle 10 and the position data feedback system 90. This allows for realtime steering control and realtime acceleration and braking control of the towing tractor vehicle 10.

Indeed, when position data feedback system 10 is gyro-based, it provides realtime steering control and realtime acceleration and braking control of the towing tractor vehicle 10 by a computer controlled inertial guidance system coupled to the gyro-based position data feed back system, in keeping with a pre-programmed set of guidance instructions in the computer.

Finally, it has been noted that the present invention provides for a method for facilitating the reduction of fuel consumption by all aircraft, but particularly by large multi-engine aircraft, such as any aircraft which has multiple jet engines or any turboprop aircraft having multiple turbine engines.

The steps for the method are noted above, and include coupling the aircraft to the aircraft towing tractor towing the aircraft to the desired location without starting the aircraft's engines, then decoupling the towing tractor vehicle from the aircraft while starting the aircraft's engines.

There has been taught a remote control aircraft rowing vehicle system which may be fully automated, or which may be such that the towing tractor vehicles may be manually returned to a desired position from whence they will next be used to tow another aircraft to the end of the taxiway near the end of the runway from which the aircraft will take off. Ocher modifications and alterations may be used in the design, layout, and of the operation of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, use of the terms "he", "him", or "his", is not intended to be specifically directed to persons of the masculine gender, and could easily be read as "she", "her", or "hers", respectively.

What is claimed is:

1. A remote controlled aircraft towing vehicle system for use primarily with large multi-engine aircraft, comprising:
   a towing tractor vehicle for aircraft;
   remote steering control means for said towing tractor vehicle; and remote acceleration and braking control means for said towing tractor vehicle;
   said towing tractor vehicle being steerable by said remote steering control means; and being capable of being started, accelerated, decelerated, and stopped by said remote acceleration and braking control means;
   a remote system controller being located in the aircraft being towed;
   wherein said remote system controller at least includes a first remote acceleration and braking control means so as to control the starting and stopping of said towing tractor vehicle; and
   wherein, after said towing tractor vehicle is started so as to cause movement of said towing tractor vehicle and concomitant movement of the aircraft being towed, steering of said towing tractor vehicle is under the control of said remote steering control means for said towing tractor vehicle;
   whereby, when said towing tractor vehicle is coupled to the aircraft to be towed, movement of the aircraft to the desired location is effected under the control of said remote system controller in the aircraft being towed, and said remote steering control means;
   wherein said towing tractor vehicle further includes remote decoupling control means for decoupling the towing tractor vehicle from the aircraft being towed when said desired location has been reached; and
   wherein communication between said towing tractor vehicle and said remote system controller located in the aircraft being towed is by way of wireless communication at a distinct frequency, or using a distinct digital ID code, which is assigned to that towing tractor vehicle.

2. The remote controlled aircraft towing vehicle system of claim 1, wherein said remote steering control means for said towing tractor vehicle is remotely controllable by said remote system controller located in the aircraft being towed.

3. The remote controlled aircraft towing vehicle system of claim 1, wherein said remote steering control means of said towing tractor vehicle is remotely controllable by a guidance system mounted under a taxiway or at the edge of a taxiway along which movement of the aircraft being towed is being effected by said remote controlled aircraft towing vehicle system.

4. The remote controlled aircraft towing vehicle system of claim 1, wherein said remote steering control means for said towing tractor vehicle is remotely controllable control means chosen from the group consisting of a remote system controller located in the aircraft being towed, and a guidance system mounted under or at the edge of a taxiway along which movement of the aircraft being towed.

5. The remote controlled aircraft towing vehicle system of claim 1, wherein said towing tractor vehicle is further controllable by an operator such that, when operator control of said towing tractor vehicle is desirable, the operator control overrides said remote steering control means and said remote acceleration and braking control means for said towing tractor vehicle.

6. The remote controlled aircraft towing vehicle system of claim 1, wherein said towing tractor vehicle is coupled to the aircraft to be towed by a towing bar attached to the nose-wheel assembly of the aircraft to be towed.

7. The remote controlled aircraft towing vehicle system of claim 1, wherein, when said towing tractor has been decoupled from the aircraft being towed, said remote steering control means and said remote acceleration and braking control means for said towing tractor vehicle directs and facilitates the further movement of said towing tractor vehicle, such that said towing tractor vehicle is moved to a second desired location therefore.

8. The remote controlled aircraft towing vehicle system of claim 7, wherein the second desired location for said towing tractor vehicle is chosen from the group consisting of a parking area adjacent the taxiway along which said towing tractor vehicle has towed an aircraft, and a parking area adjacent a terminal building from which said towing tractor vehicle will next be used to tow an aircraft.

9. The remote controlled aircraft towing vehicle system of claim 1, wherein said towing tractor vehicle includes a position data feedback system chosen from the group consisting of GPS, LORAN, and a gyro-based position sensor, whereby the precise location of said towing tractor vehicle may be determined at any instant in time by computer means located on said towing tractor vehicle, and optionally by a control tower at the airport where said remote controlled aircraft towing vehicle system is being operated.

10. The remote controlled aircraft towing vehicle system of claim 1, wherein the starting acceleration, deceleration, and braking of said towing tractor vehicle may be overridden by a second remote acceleration and braking control means located in a control tower at the airport where said remote controlled aircraft towing vehicle system is being operated.

11. The remote controlled aircraft towing vehicle system of claim 9, wherein said remote steering control means for said towing tractor vehicle comprises an autonomous remote guidance system coupled to said position data feedback system, for realtime steering control and realtime acceleration and braking control of said towing tractor vehicle.

12. The remote controlled aircraft towing vehicle system of claim 9, wherein said position data feedback system is chosen from the group consisting of GPS, LORAN, and a gyro-based position sensor, and realtime steering control and realtime acceleration and braking control of said towing tractor vehicle is effected by a computer controlled inertial guidance system coupled to said gyro-based position data feedback system, in keeping with a pre-programmed set of guidance instructions in a computer therefore.

13. The remote controlled aircraft towing vehicle system of claim 1, wherein, when said towing tractor vehicle has been decoupled from the aircraft being towed, an operator exercising normal control for said towing tractor vehicle facilitates the return of at least one towing tractor vehicle for re-use; and wherein, when the operator returns at least two towing tractor vehicles for re-use, said towing tractor vehicles include towing means such that said at least two towing tractor vehicles are coupled to each other.

14. A method of facilitating the reduction of fuel consumption by large multi-engine aircraft, wherein said method comprises the steps of:
   (a) coupling an aircraft to an automated aircraft towing system comprising:
      a towing tractor vehicle for aircraft;
      remote steering control means for said towing tractor vehicle; and remote acceleration and braking control means for said towing tractor vehicle;
      said towing tractor vehicle being steerable by said remote steering control means; and being capable of being started, accelerated, decelerated, and stopped by said remote acceleration and braking control means;

a remote system controller being located in the aircraft being towed;

wherein said remote system controller at least includes a first remote acceleration and braking control means so as to control the starting and stopping of said towing tractor vehicle; and wherein, after said towing tractor vehicle is started so as to cause movement of said rowing tractor vehicle and concomitant movement of the aircraft being towed, steering of said towing tractor vehicle is under the control of said remote steering control means for said towing tractor vehicle;

whereby, when said towing tractor vehicle is coupled to the aircraft co be towed, movement of the aircraft to the desired location is effected under the control of said remote system controller in the aircraft being towed, and said remote steering control means;

wherein said towing tractor vehicle further includes remote decoupling control means for decoupling the towing tractor vehicle from the aircraft being towed when said desired location has been reached; and wherein communication between said towing tractor vehicle and said remote system controller located in the aircraft being towed is by way of wireless communication at a distinct frequency, or using a distinct digital ID code, which is assigned to that towing tractor vehicle;

(b) towing the aircraft by said aircraft towing vehicle to said desired location without starting the aircraft's engines;

(c) starting the aircraft's engines; and (d) decoupling said towing tractor vehicle from the aircraft;

whereby the use of said rowing tractor vehicle eliminates a portion of the aircraft idling time such that the engines thereof may be started upon the aircraft's arrival at said desired location, thereby conserving the fuel otherwise required for taxiing the aircraft.

15. The method of claim 14, wherein the aircraft to be moved has multiple jet engines or multiple turbine engines driving propellers.

* * * * *